United States Patent
Khan et al.

(10) Patent No.: US 10,803,392 B1
(45) Date of Patent: Oct. 13, 2020

(54) DEPLOYING MACHINE LEARNING-BASED MODELS

(71) Applicant: AMAZON TECHNOLOGIES, INC., Seattle, WA (US)

(72) Inventors: Mohammad Asif Ali Khan, San Jose, CA (US); Brett Francis, Redwood, CA (US); Guy Ernest, Redmond, WA (US)

(73) Assignee: Amazon Technologies, Inc, Seattle, WA (US)

( * ) Notice: Subject to any disclaimer, the term of this patent is extended or adjusted under 35 U.S.C. 154(b) by 760 days.

(21) Appl. No.: 15/455,866

(22) Filed: Mar. 10, 2017

(51) Int. Cl.
  *G06N 5/04* (2006.01)
  *H04L 29/08* (2006.01)
  *G06N 20/00* (2019.01)

(52) U.S. Cl.
  CPC ............... *G06N 5/04* (2013.01); *G06N 20/00* (2019.01); *H04L 67/10* (2013.01)

(58) Field of Classification Search
  None
  See application file for complete search history.

(56) References Cited

PUBLICATIONS

Rendle, et al., Robust Large-Scale Machine Learning in the Cloud, Proceedings of the 22nd ACM SIGKDD International Conference on Knowledge Discovery and Data Mining (2016) pp. 1125-1134 (Year: 2016).*

Tutorial—mxnet documents, http://mxnet.io/tutorials/index.html, [retrieved from the Internet on Aug. 30, 2017], 2 pages.

Machine Eye, Makes your machines to see, http://rupeshs.github.io/machineye/, [retrieved from the internet on Aug. 30, 2017], 1 page.

AWS CodePipeline, User Guide, API Version Jul. 9, 2015, http://docs.aws.amazon.com/codepipeline/latest/userguide/codepipeline-user.pdf, 192 pages.

AWS CodeCommit, User Guide, API Version Apr. 13, 2015, http://docs.aws.amazon.com/codecommit/latest/userguide/codecommit-user.pdf, 228 pages.

AWS CodeBuild, User Guide, API Version Oct. 6, 2016, http://docs.aws.amazon.com/codebuild/latest/userguide/codebuild-user.pdf, 210 pages.

AWS CloudFormation, User Guide, API Version May 15, 2010, http://docs.aws.amazon.com/AWSCloudFormation/latest/UserGuide/cfn-ug.pdf, 1981 pages.

Amazon EC2 Container Service, Developer Guide, API Version Nov. 13, 2014, http://docs.aws.amazon.com/AmazonECS/latest/developerguide/ecs-dg.pdf, 345 pages.

Amazon ECR, User Guide, API Version Sep. 21, 2015, http://docs.aws.amazon.com/AmazonECR/latest/userguide/ecr-ug.pdf, 58 pages.

* cited by examiner

*Primary Examiner* — Wilbert L Starks
(74) *Attorney, Agent, or Firm* — Lowenstein Sandler LLP (57) ABSTRACT

A method of deploying machine learning-based models may include identifying a profile of a target execution environment to implement a machine learning-based model in communication with a cloud infrastructure. The method may further include identifying, using the profile, a software module implementing the model. The method may further include causing the software module to be uploaded from a code repository associated with the cloud infrastructure to the target execution environment.

17 Claims, 9 Drawing Sheets

DEPLOYING MACHINE LEARNING-BASED MODELS

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on demand self-service, broad network access, resource pooling, rapid elasticity, and measured service. The cloud computing model includes several service models, including Software as a Service (SaaS), Platform as a Service (PaaS), and Infrastructure as a Service (IaaS). The cloud computing model may be implemented according to one of the several deployment models, including private cloud, community cloud, public cloud, and hybrid cloud.

BRIEF DESCRIPTION OF THE DRAWINGS

The examples described herein will be understood more fully from the detailed description given below and from the accompanying drawings, which, however, should not be taken to limit the application to the specific examples, but are for explanation and understanding only.

DETAILED DESCRIPTION

Described herein are systems and methods for deploying machine learning-based models to various target execution environments.

Machine learning-based methods discover pattern in historical data and construct predictive models using these patterns. The models may predict values of binary attributes (binary classification), categorical attributes (multi-class classification), or numeric attributes (regression). In one embodiment, the output of a classification function may reflect the degree of association of an image being analyzed with a certain category of images (e.g., reflecting the probability of the image being associated with the certain category). Upon evaluating a chosen classification function (also referred to as "prediction" function) for each category of a certain set of categories, the image may be associated with the category corresponding to the optimal (e.g., minimal or maximal) value of the classification function.

In one embodiment, the prediction function may be produced by supervised learning methods, which involve inferring the prediction function from a training data set. The training data set may include multiple pairs of labeled input objects, such as each input object is labeled with a value indicating its category. A supervised learning method may analyze the training data set and produce the prediction function, which can be used for classifying previously unseen input objects.

In one embodiment, an image classification function may be implemented by a network-connected device (such as an Internet of Things (IoT) device, e.g., a video camera) in communication with one or more cloud-based execution environments. A cloud-based execution environment may be represented by one or more cloud infrastructure stacks, such that each cloud infrastructure stack includes a collection of resources that implements the cloud computing model. At the physical layer, a cloud infrastructure stack may include hardware resources employed to support the cloud services being provided, such as compute, network, and storage servers. At the abstraction layer, a cloud infrastructure stack may include various software modules deployed across the physical layer for delivering the cloud functionality to the user. From the user's perspective, a cloud infrastructure stack may include compute instances, storage instances, database instances, messaging instances, logical networks, load balancers, or various other resources.

In order to reduce the response latency, the prediction function may be deployed by an IoT device which serves as the data input device (e.g., a video camera), while the training function (which may be more computationally complex or may require larger storage capacity) may be implemented by a cloud-based execution environment. In one embodiment, a video or still image camera may be employed to acquire images and perform various image recognition tasks (e.g., image classification, movement detection, or face detection) using one or more prediction models implemented by software modules that have been downloaded from a cloud-based code repository. Training of the prediction models may be performed by one or more model training applications that may be deployed in a cloud-based execution environment. A code deployment pipeline may be employed to put the software modules implementing the trained modules into the cloud-based code repository for subsequent downloads by IoT devices, such a video or still image cameras.

Prediction functions may have high computational complexity, and thus require significant computing resources. Conversely, the processing power, available memory, or other operational characteristics may differ significantly among various types and models of IoT devices. The computational complexity of a prediction model may be lowered by varying the model structure or parameters, which may lead to reducing the desired prediction accuracy or increasing the model response time. Therefore, prediction models may be customized based on the IoT device parameters in order to conform to the desired operational requirements (e.g., the prediction accuracy and the response time).

In one embodiment, a target execution environment (e.g., an IoT device or a cloud-based execution environment) for execution of a prediction model may be characterized by a target execution environment profile. Such a profile may be represented, e.g., by a vector of values of certain parameters of the target execution environments. The parameters may include the processing unit type, the processor clock frequency, the amount of memory available to the execution environment, and other characteristics of the execution environment. In one embodiment, a model best fitting the target execution environment profile may be selected among two or more pre-built models and may be deployed to the target execution environment.

In order to further optimize resource utilization while conforming to the desired operational requirements, a prediction model may be deployed to two or more hierarchically-layered execution environments. In one embodiment, a first layer may be deployed to an IoT device (e.g., a video or a still image camera) while one or more subsequent layers may be deployed to the respective cloud-based execution environments. Employing each new layer of the multi-layer hierarchy would increase the response latency, which is easily perceivable by the end user of an IoT device. In order to minimize the response latency, the prediction model should be placed on or close to the IoT device, while the next layers of the multi-layer hierarchy may be employed if the local placement of the model fails to achieve the desired operational requirements (e.g., the prediction accuracy and the response time).

For example, a video camera may be employed to acquire a sequence of images (e.g., at the frame of 24 frames per second) and perform motion detection. Responsive to detecting a moving object within a series of images, the IoT device may transmit the images to the second layer recognition model, which may be employed in a cloud-based execution environment and may perform face detection. Responsive to detecting a face within an image, the second layer recognition model may transmit the image to the third-layer model, which may be employed in a cloud-based execution environment and may perform face recognition. The execution environments hosting the second- and third-layer models may be scalable, in order to dynamically adapt to changing rates of requests.

Therefore, the systems and methods described herein improve the efficiency and scalability of prediction models, by selecting the best-fitting prediction model conforming to the specified operational requirements (e.g., the prediction accuracy and the response time) for deployment to the target execution environment. The system and methods described herein further provide multi-layered execution environments, in which each execution environment executes the best-fitting prediction model. Thus, the systems and methods described herein represent improvements over various common prediction model-based methods, by providing systems and methods for deploying machine learning-based models to various target execution environments. The systems and methods described herein may be implemented by hardware (e.g., general purpose or specialized processing devices, or other devices and associated circuitry), software (e.g., instructions executable by a processing device), or a combination thereof. Various aspects of the above referenced methods and systems are described in details herein below by way of example, rather than by way of limitation.

Figure 1:
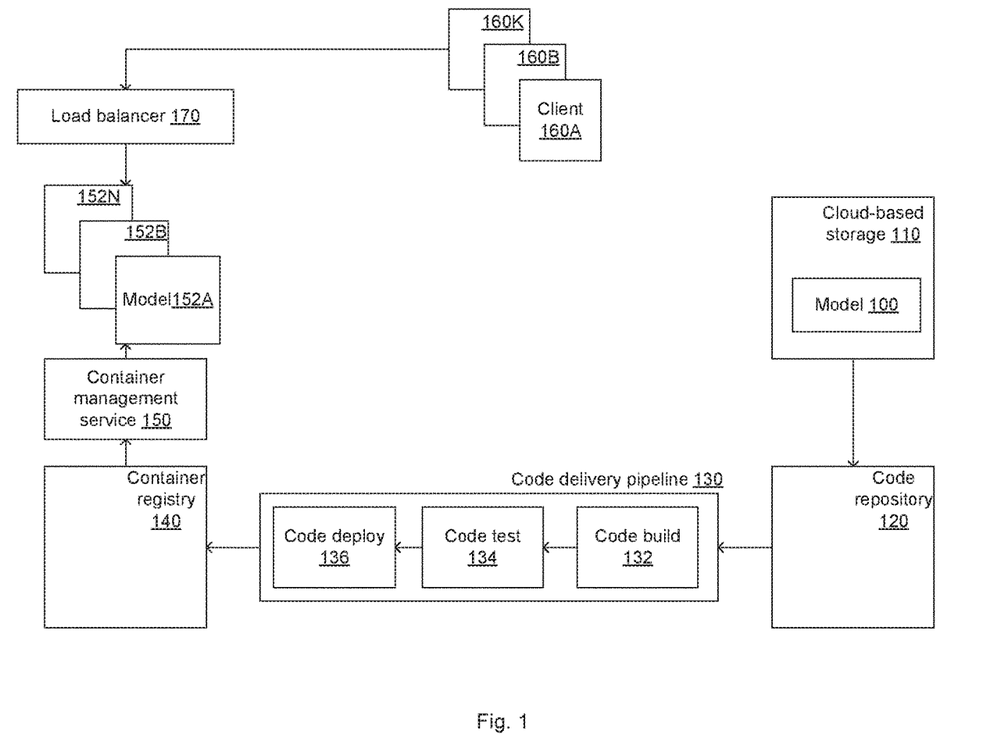
FIG. 1 schematically illustrates one embodiment of a deployment workflow for deploying machine learning-based models to various target execution environments.

FIG. 1 schematically illustrates one embodiment of a deployment workflow for deploying machine learning-based models to various target execution environments. As schematically illustrated by FIG. 1, a machine learning-based prediction model 100 may be built, trained, and stored in a cloud-based storage 110. The software code implementing the machine learning-based prediction model may be committed by the application developer to a code repository 120.

A cloud infrastructure provisioning service may provision a cloud infrastructure stack including a code delivery pipeline 130 for processing the committed code stored in the code repository 120. In one embodiment, the code delivery pipeline 130 may be triggered by a code commit event generated by the code repository 120.

In one embodiment, the code delivery pipeline 130 may include a code build stage 132, a code test stage 134, and a code deploy stage 136. The code deploy stage 136 may produce a container image for deployment in cloud-based execution environments. The container image may be stored in a container registry 140.

Responsive to having been notified of availability of a new container image, a container management service 150 may retrieve the container image from the container registry 140 and provision one or more containers 152A-152N for executing the container image. The access to the containers 152 by client applications 160A-160K may be managed by a load balancer 170.

As schematically illustrated by FIG. 1, various cloud-based services may be utilized for efficient provisioning of machine learning-based functions. In one embodiment, containers 152A-152N may include code images to be downloaded by IoT devices 160A-160K based on the device profile, as described in more detail herein below. In one embodiment, containers 152A-152N may include prediction model executable code to be invoked by client applications running on IoT devices 160A-160K for implementing multi-layered prediction models, as described in more detail herein below.

Figure 2:
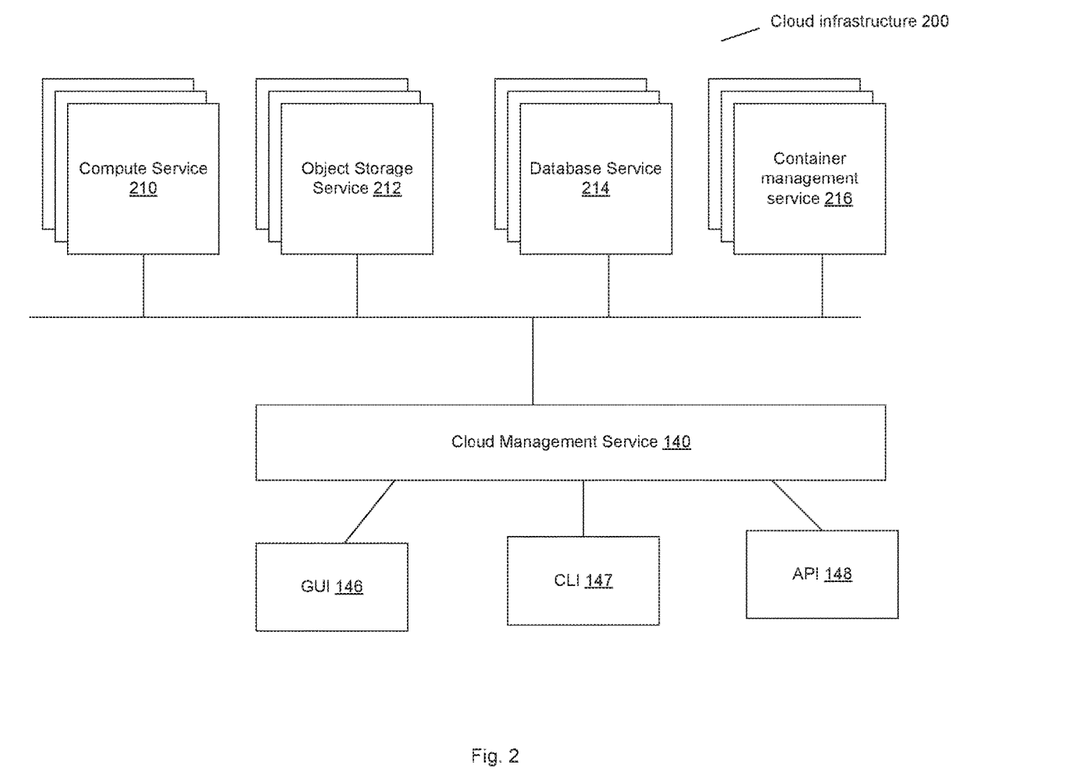
FIG. 2 schematically illustrates one embodiment of a cloud infrastructure that may be utilized for deploying machine learning-based models.

FIG. 2 schematically illustrates one embodiment of a cloud infrastructure that may be utilized for deploying machine learning-based models. As schematically illustrated by FIG. 2, the cloud infrastructure 200 may include a compute service 210, an object storage service 212, a database service 214, a container management service 216, as well as various other services that are omitted from FIG. 2 for clarity and conciseness. While FIG. 2 illustrates each of the above listed services running on a dedicated hardware server, in one embodiment, two or more services may be collocated on a single hardware server. Servers executing the above listed services may be interconnected by one or more networks 230, including one or more virtual networks, one or more local area networks, one or more wide area networks, or any combination thereof.

In one embodiment, the compute service 210 may provide scalable computing capacity, e.g., in the form of virtual machine instances or containers. The object storage service 212 may implement a scalable object storage system with a web service interface. The database service 214 may implement a relational database supporting structured query language (SQL) interface. The container management service 216 may manage containers running on compute instances. In one embodiment, the container management service 216 may export an application programming interface (API) for starting and stopping container-based applications, and performing various container-management tasks including scheduling container instances based on resource needs, security policies and availability requirements.

The above-referenced and other services provided by the cloud infrastructure 200 may have configurable high-availability, auto-scaling and other operational features. The above-referenced and other services may be managed by the cloud management service 240 which, among other functions, may perform resource provisioning and configuration. The cloud management service 240 may export a graphical user interface (GUI) 146, a command line interface (CLI) 147, and/or an application programming interface (API) 148.

In one embodiment, the cloud management service may implement template-based infrastructure deployment pipeline. A template specifying a cloud infrastructure stack may be represented by a text in a certain formal language (such as JSON or YAML). The template may include definitions of resources, their inter-dependencies, and their properties. The template may include several sections, including a required Resource section which specifies the stack resources and their properties and an optional Parameters section that specifies the values to be passed to the template at runtime (i.e., when the infrastructure stack is being created or updated). The cloud management service may parse the template and cause the hardware and software resources be provisioned and configured for implementing the cloud infrastructure stack specified by the template.

As noted herein above, IoT devices in communication with cloud-based execution environments may be employed for implementing machine-learning prediction functions, e.g. classification functions. In one embodiment, a classification function may yield the degree of association of an object being analyzed with a certain category of objects (e.g., reflecting the probability of the object being associated with the certain category). In various embodiments, prediction models may be based on decision forests, neural networks, and other hierarchical learning methods. Prediction models may be employed by various applications, including image recognition, face recognition, speech recognition, speech to text transformation, automatic translation of natural language text or speech, etc.

Due to the intrinsically high computational complexity, prediction functions may require significant computing resources. Conversely, IoT devices may have limited processing power, available memory, or other computing resources. Furthermore, parameters of available computing resources may differ significantly among various types and models of IoT devices.

In one embodiment, the computational complexity of a prediction model may be lowered by varying the model structure or parameters. However, this may lead to reducing the desired prediction accuracy or increasing the model response time.

In one embodiment, the computational complexity of a prediction model may be reduced by limiting the amount of input data to be processed by the model. For example, limiting the input image resolution reduces the number of pixels in the image and thus reduces both the amount of storage needed for storing the image and the computational complexity of image analysis procedures. However, the reduced image resolution may lead to loss of some visual details within the image, thus hindering the ability of the prediction model to correctly perform the image classification (e.g., optical character recognition of symbols depicted by the image).

In one embodiment, for a model implemented as a neural network including multiple layers, the computational complexity of the model may be reduced by limiting the number of layers in the neural network. Limiting the number of layers in a neuron network employed for image classification reduces both the amount of storage needed for storing the neuron network layers and the computational complexity of the neural network. However, the reduced number of neural network layers may hinder the ability of the prediction model to correctly perform the image classification (e.g., optical character recognition of symbols depicted by the image).

In one embodiment, a prediction model may be customized based on the target execution environment (e.g., an IoT device or a cloud-based execution environment) in order to conform to the specified operational requirements (e.g., the prediction accuracy and the response time). The target execution environment for execution of a prediction model may be characterized by a target execution environment profile. Such a profile may be represented, e.g., by a vector of values of certain parameters of the target execution environments. The parameters may include the processing unit type, the processor clock frequency, the amount of memory available to the execution environment, and/or other characteristics of the execution environment.

In one embodiment, a model best fitting the target execution environment profile may be selected among two or more pre-built models for deployment to the target execution environment. Upon evaluating, for each candidate model, a fitness function indicating the degree of compatibility of a respective candidate model with a given target execution environment characterized by the execution environment profile, the candidate model having the optimal (e.g., maximal or minimal) value of the fitness function may be selected for deploying in the target execution environment.

In one embodiment, a model to be deployed within a target execution environment may be characterized by a model size, which may be represented by a function of the operational requirements (e.g., the desired accuracy and/or response time) and one or more parameters of the target execution environment profile (e.g., the processing unit type, the processor clock frequency, the amount of memory available to the execution environment, and/or other characteristics of the execution environment).

In one embodiment, a model may be characterized by a model-specific optimal execution environment profile which may be represented by a vector of values specifying the optimal (e.g., maximal or minimal) values of the parameters the execution environment in which the model may successfully operate while satisfying certain operational requirements. The parameters may include the processing unit type, the minimal requisite processor clock frequency, the minimal requisite amount of memory available to the execution environment, and/or other characteristics of the target execution environment. The operational requirements may include a specified accuracy value and a specified maximal response time. Thus, in one embodiment, a model running within an execution environment which conforms to the model-specific optimal execution environment profile may produce the prediction accuracy exceeding the specified accuracy value within a response time which is equal or less than a specified maximal response time. In one embodiment, a fitness function may be defined that yields the degree of compatibility of a candidate model (characterized by the model-specific optimal execution environment profile) with a given target execution environment (characterized by the target execution environment profile) while conforming to specified operational requirements (e.g., the maximum allowed accuracy value and the maximum allowed response time).

In one embodiment, a fitness function may indicate the degree of compatibility of a candidate model (characterized by the model-specific optimal execution environment profile) with a given target execution environment (characterized by the target execution environment profile) and a given set of operational requirements, Such a fitness function may be represented by a weighted sum, each term of which represents a difference of values of a certain parameter of the model-specific optimal execution environment and the target execution environment:

$$F(Pmod, Ptarg) = \Sigma(w_i * (Pmod_i - Ptarg_i)), \text{ wherein}$$

F represents the fitness function indicating the degree of compatibility of a candidate model having the optimal execution environment profile Pmod with a target execution environment having the target execution environment profile Ptarg, and $w_i$ is the i-th component of the weight vector W.

In one embodiment, the parameters of the optimal execution environment associated with a given model may depend upon the operational requirements. For example, the minimal required processor clock frequency may be a function of the desired response time, and the minimal required available memory may be a function of the desired model accuracy:

$$F(Popt(R), Ptarg) = \Sigma(w_i * (Popt_i - Ptarg_i)), \text{ wherein}$$

R is the vector of the operational requirements (e.g. the minimal required processor clock frequency and the minimal required available memory).

Figure 3:
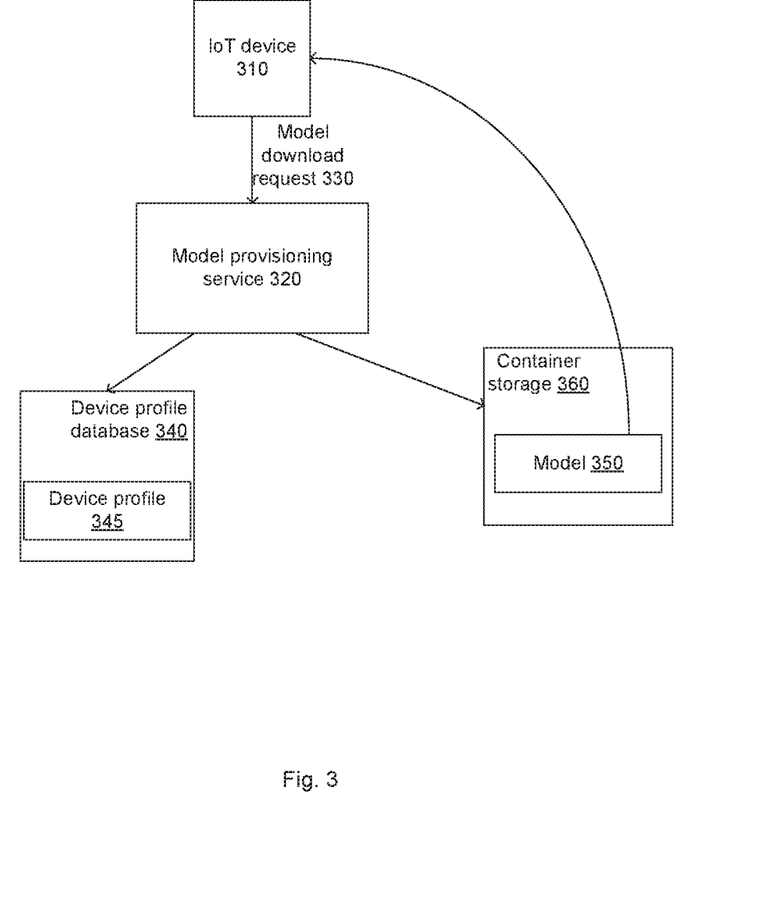
FIG. 3 schematically illustrates one embodiment of deploying a machine learning based model to an Internet-of-Things (IoT) device.

As noted herein above, in one embodiment, a target execution environment for a prediction model may be provided by an IoT device (e.g., a video camera). As schematically illustrated by FIG. 3, the IoT device 310 may, upon start-up or reset, connect to a cloud-based model provisioning service 320 and transmit a model download request 330. The request may include an identifier of the device type and model, which may be represented by an alphanumeric string. In one embodiment, the MAC address of the IoT device network interface card may be utilized as the device type identifier. Responsive to receiving the model download request 330, the provisioning service 320 may authenticate the requesting IoT device 330 and query a device profile database 340 to retrieve the device profile 345 corresponding to the device type identified by the request 330. The provisioning service 320 may then evaluate, for one or more candidate models, a fitness function indicating the degree of compatibility of a respective candidate model with the target execution environment profile, and select the candidate model having the optimal (e.g., maximal or minimal) value of the fitness function. The provisioning service may then make the selected model 350 available to the download by the requesting IoT device (e.g., by transmitting to the requesting IoT device a uniform resource identifier (URI) of the location within the container storage 360 from which the identified model 350 may be downloaded). In one embodiment, the model may be encrypted and cryptographically signed by the provisioning service in order to be securely transmitted to the target IoT device.

In one embodiment, the provisioning service 320 may push the model 350 to one or more IoT devices 310 responsive to detecting a certain triggering event. The triggering event may be represented by a model update event (e.g., when the model has been updated in the container storage 360).

In order to further optimize resource utilization while conforming to the desired operational requirements, a prediction model may be deployed, in a hierarchical manner, to two or more execution environments. In one embodiment, a first layer of the model may be deployed to an IoT device (e.g., a video or a still image camera), while one or more subsequent layers may be deployed to scalable cloud-based execution environments. In one embodiment, one or more operational characteristics (e.g., the processor clock frequency or the amount of memory available to the execution environment) of computing resources provided by each subsequent hierarchical layer may exceed the respective characteristics of the preceding layer. Each subsequent model of the multi-layer hierarchy is consumed when a prediction accuracy exceeding that of the previous layer is desired. Since the improved prediction accuracy increases the model response latency or the increases the infrastructure costs to the end user, the multi-layered hierarchical architecture provides a certain degree of flexibility in balancing those factors. The execution environments hosting the second- and third-layer models may be scalable, in order to dynamically adapt to changing rates of requests.

Figure 4:
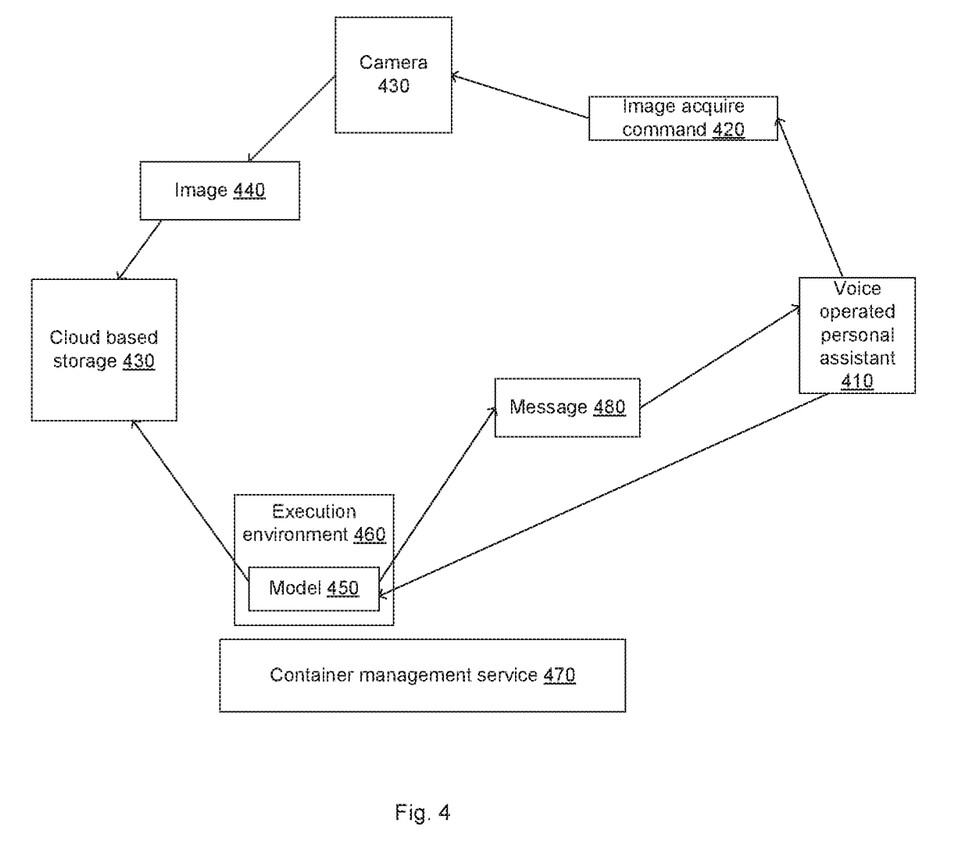
FIG. 4 schematically illustrates one embodiment of an IoT device-based application utilizing a prediction model for image recognition.

FIG. 4 schematically illustrates one embodiment of an IoT device-based application utilizing a prediction model for image recognition. As schematically illustrated by FIG. 4, a voice-operated device 410 may implement a voice-controlled intelligent personal assistant service. Responsive to receiving and successfully decoding a voice command, the voice-operated device 410 may transmit, via a secure messaging service, a command 420 to a camera 430 to acquire an image. Responsive to acquitting the image 440, the camera 430 may execute an embedded prediction model for image recognition. If the attempt to recognize the image by the embedded model fails, the camera 430 may upload the image 440 to a cloud-based storage 440 and invoke a cloud-based prediction model 450 operating in the cloud-based execution environment 460 managed by a container management service 470. The cloud-based prediction model may download the image from the cloud-based storage 430. Responsive to recognizing the image, the cloud-based prediction model may build a text message 480 encoding the result and transmit to the text message to the voice-operated device 410. Responsive to receiving the message 480, the voice-operated personal assistant device 410 may translate the text to speech and generate a voice response to the image recognition request.

Figure 5:
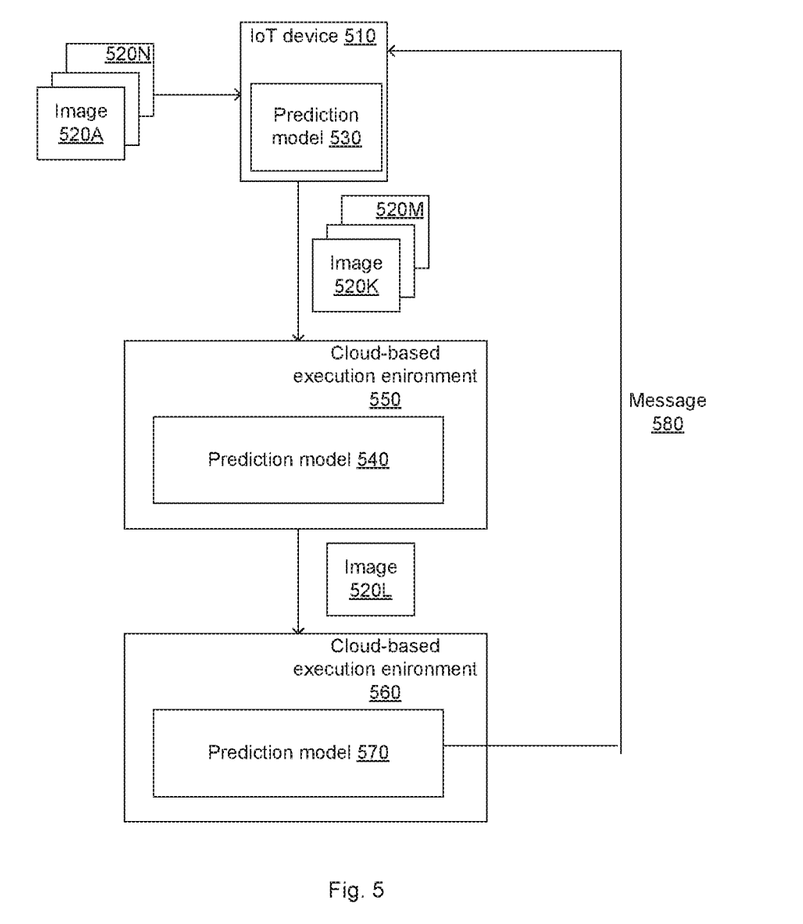
FIG. 5 schematically illustrates one embodiment of a multi-layer execution environment for a prediction model.

FIG. 5 schematically illustrates one embodiment of a multi-layer execution environment for a prediction model. As schematically illustrated by FIG. 5, an IoT device 510 may employ a video camera for acquiring a sequence of images 520A-520N (e.g., at the rate of 24 frames per second) and trigger a first layer prediction model 530 to perform motion detection within the acquired sequence of images. Responsive to detecting a moving object within a series of images, the IoT device may transmit one or more images 520K-520M to the second layer prediction model 540 deployed in a cloud-based execution environment 550. The prediction model 540 may be utilized to perform face detection within the input images. Responsive to detecting a face within an image 520L, the second layer prediction model 540 may transmit the image to the third-layer prediction model 570 deployed in a cloud-based execution environment 560. The third layer prediction model 570 may be utilized to perform face recognition within the input images. Responsive to recognizing a face within the image 520L, the prediction model 570 may transmit a message 580 to the IoT device 510. The execution environments hosting the second- and third-layer models may be scalable, in order to dynamically adapt to changing rates of requests.

Figure 6:
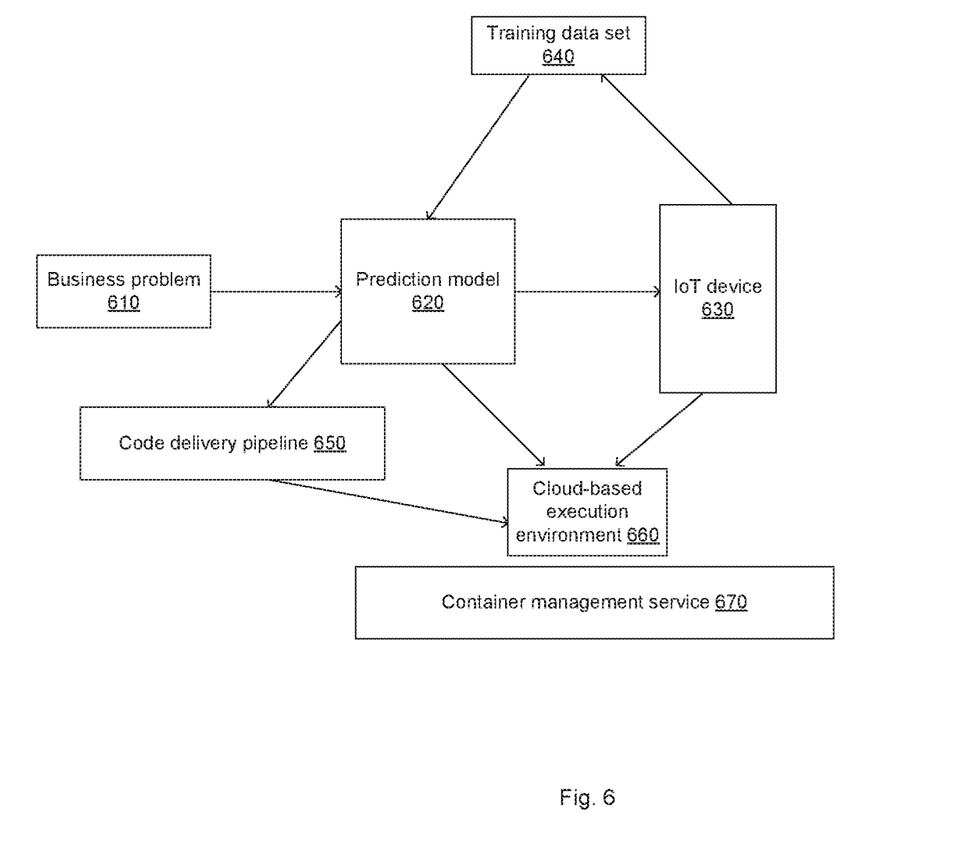
FIG. 6 schematically illustrates one embodiment of a life cycle of an IoT application utilizing a machine learning-based prediction model.

FIG. 6 schematically illustrates one embodiment of a life cycle of an IoT application utilizing a machine learning-based prediction model. Upon formulating a business problem 610, a machine learning-based prediction model 620 may be developed for deploying at the IoT device 630. The prediction model 630 may be trained using the training data set 640. The code build and delivery pipeline 650 may produce one or more executables implementing the prediction model 630 for deployment a cloud-based execution environment 660 managed by the container management service 660. The data collected by the IoT device 630 may be fed back to the training set 640 for training prediction model 620, thus continuing the model training over its lifecycle.

Figure 7:
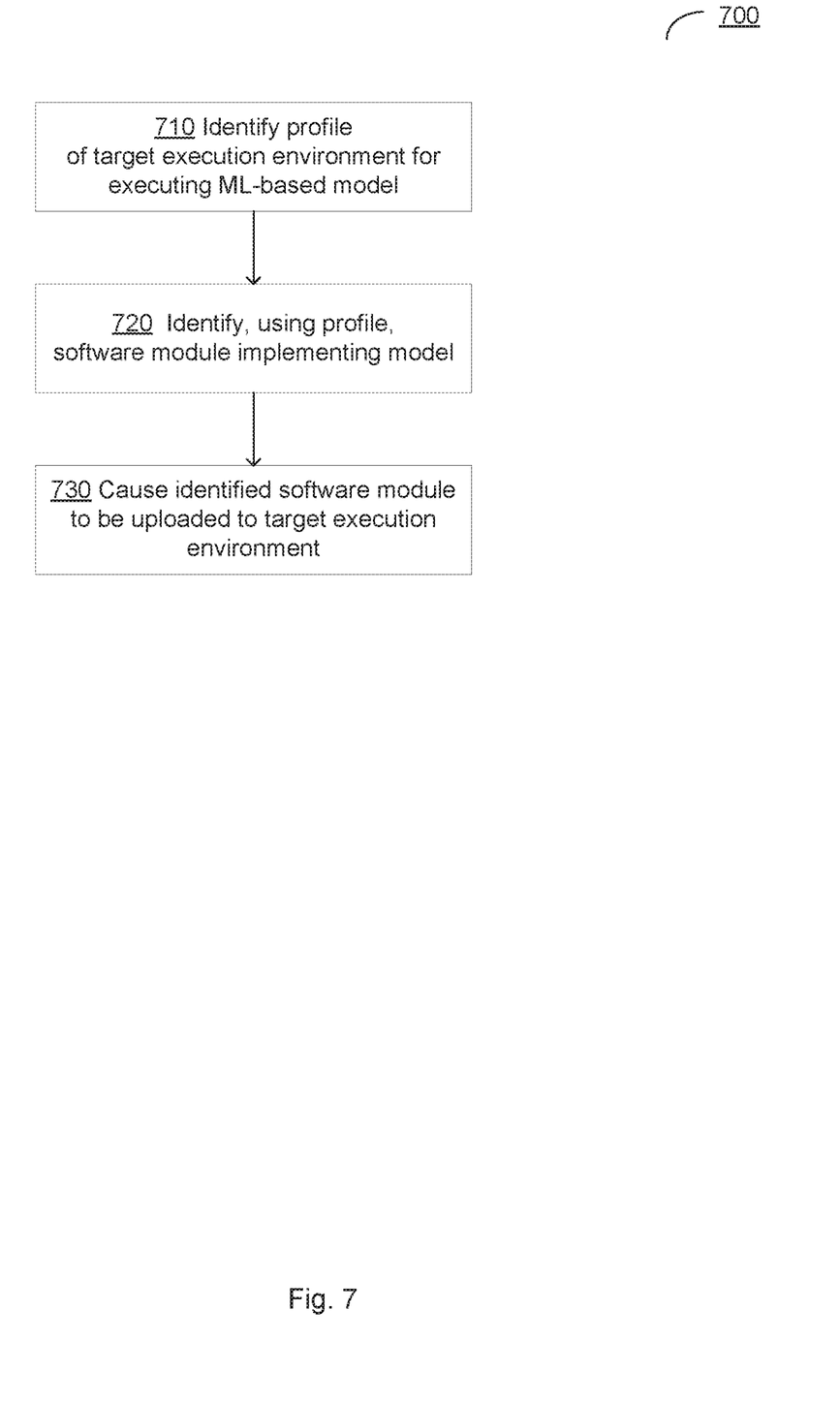
FIG. 7 is a flow diagram of one embodiment of a method of deploying machine learning-based models to target execution environments.

FIG. 7 is a flow diagram of one embodiment of a method of deploying machine learning-based models to target execution environments. Method 700 may be performed by processing logic that includes hardware (e.g., circuitry, dedicated logic, programmable logic, microcode, etc.), software (e.g., instructions run on a processor to perform hardware simulation), or a combination thereof. Method 700 or each of its individual functions, routines, subroutines, or operations may be performed by one or more processors of a computer system (e.g., the computing device 900 of FIG. 9) implementing the method. In one embodiment, method 700 may be performed by a single processing thread. Alternatively, method 700 may be performed by two or more processing threads, each thread implementing one or more individual functions, routines, subroutines, or operations of the method. In one embodiment, the processing threads implementing method 700 may be synchronized (e.g., using semaphores, critical sections, or other thread synchronization mechanisms). Alternatively, the processing threads implementing method 700 may be executed asynchronously with respect to each other. Therefore, while FIG. 7 and the associated description lists the operations of method 700 in certain order, various embodiments of the method may perform at least some of the described operations in parallel or in arbitrary selected orders.

Referring to FIG. 7, at block 710, a processing device implementing the method may identify a profile of a target execution environment to implement a machine learning-based model in communication with a cloud infrastructure. In various embodiments, the model may include a prediction model, a classification model, and/or a regression model. The target execution environment may be provided by an IoT device or a cloud-based container. The profile of the target execution environment may specify the amount of memory available to the target execution environment and/or a parameter of a processing unit of the target execution environment, as described in more detail herein above.

At block 720, the processing device implementing the method may identify, using the target execution environment profile, a software module implementing the model, such that the software module is compatible with the target execution environment. In one embodiment, a software module to be deployed within a target execution environment may be characterized by a model size, which may be represented by a function of the operational requirements (e.g., the desired accuracy and/or response time) and one or more parameters of the target execution environment profile (e.g., the processing unit type, the processor clock frequency, the amount of memory available to the execution environment, and/or other characteristics of the execution environment).

In one embodiment, in order to identify the software module for deployment to the target execution environment, the processing device may evaluate, for a plurality of candidate software modules, a fitness function reflecting a degree of compatibility of a respective candidate software module with the target execution environment. The processing device may then select the software module which yields the optimal (e.g., minimal or maximal) value of the fitness function, as described in more detail herein above.

At block 730, the processing device implementing the method may cause the identified software module to be uploaded from a code repository associated with the cloud infrastructure to the target execution environment. In one embodiment, the processing device may make the software module available for download and transmit to the target execution environment a message specifying a uniform resource identifier (URI) of the location within a cloud-based container storage from which the identified software module may be downloaded. In one embodiment, the software module may be encrypted and cryptographically signed by the processing device in order to be securely transmitted to the target execution environment. In one embodiment, the processing device may push the software module to one or more execution environments responsive to detecting a certain triggering event, such as the software module having been updated in the code repository, as described in more detail herein above. Responsive to completing operations of block 730, the method may terminate.

Figure 8:
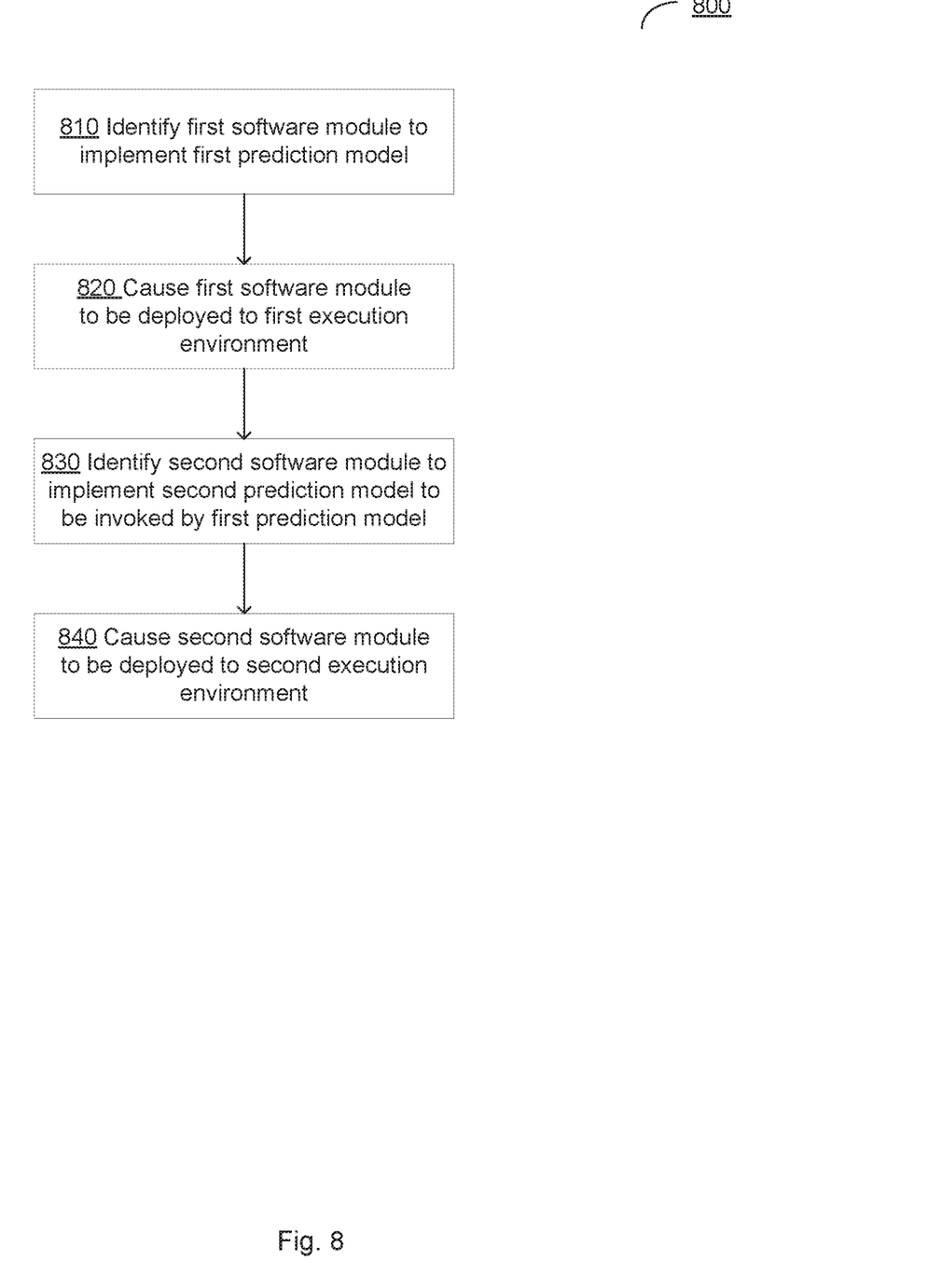
FIG. 8 is a flow diagram of one embodiment of a method of deploying machine learning-based models to multi-layer execution environments.

FIG. 8 is a flow diagram of one embodiment of a method of deploying machine learning-based models to multi-layer execution environments. Method 800 may be performed by processing logic that includes hardware (e.g., circuitry, dedicated logic, programmable logic, microcode, etc.), software (e.g., instructions run on a processor to perform hardware simulation), or a combination thereof. Method 800 or each of its individual functions, routines, subroutines, or operations may be performed by one or more processors of a computer system (e.g., the computing device 900 of FIG. 9) implementing the method. In one embodiment, method 800 may be performed by a single processing thread. Alternatively, method 800 may be performed by two or more processing threads, each thread implementing one or more individual functions, routines, subroutines, or operations of the method. In one embodiment, the processing threads implementing method 800 may be synchronized (e.g., using semaphores, critical sections, or other thread synchronization mechanisms). Alternatively, the processing threads implementing method 800 may be executed asynchronously with respect to each other. Therefore, while FIG. 8 and the associated description lists the operations of method 800 in certain order, various embodiments of the method may perform at least some of the described operations in parallel or in arbitrary selected orders.

Referring to FIG. 8, at block 810, a processing device implementing the method may identify, using a first profile of a first target execution environment, a first software module implementing a first prediction model. In one embodiment, the first target execution environment may be provided by an IoT device. In various embodiments, the model may include a prediction model, a classification model, and/or a regression model. The profile of the first target execution environment may specify the amount of memory available to the target execution environment and/or a parameter of a processing unit of the target execution environment.

In one embodiment, a software module to be deployed within a target execution environment may be characterized by a model size, which may be represented by a function of the operational requirements (e.g., the desired accuracy and/or response time) and one or more parameters of the target execution environment profile (e.g., the processing unit type, the processor clock frequency, the amount of memory available to the execution environment, and/or other characteristics of the execution environment).

In one embodiment, in order to identify the first software module for deployment to the first target execution environment, the processing device may evaluate, for a plurality of candidate software modules, a fitness function reflecting a degree of compatibility of each candidate software module with the first target execution environment. In one embodiment, the fitness function may be represented by a weighted sum of terms, such that each term represents a difference of a value of a parameter of a model-specific optimal execution environment and a value of the parameter of the target execution environment. Upon evaluating the fitness function for the candidate software modules, the processing device may select the candidate software module which yields the optimal (e.g., minimal or maximal) value of the fitness function, as described in more detail herein above.

At block 820, the processing device implementing the method may cause the identified first software module to be deployed to the first target execution environment. In one embodiment, the processing device may make the software module available for download and transmit to the target execution environment a message specifying a uniform resource identifier (URI) of the location within a cloud-based container storage from which the identified software module may be downloaded. In one embodiment, the software module may be encrypted and cryptographically signed by the processing device in order to be securely transmitted to the target execution environment. In one embodiment, the processing device may push the software module to one or more execution environments responsive to detecting a certain triggering event, such as the software module having been updated in the code repository, as described in more detail herein above.

At block 830, the processing device implementing the method may identify a second software module implementing a second prediction model to be invoked by the first prediction model, for implementing a multi-layer deployment. In one embodiment, the prediction accuracy of the second prediction model may exceed the prediction accuracy of the first prediction model. In one embodiment, the second target execution environment may be provided by a cloud-based container managed by a cloud management service, as described in more detail herein above.

At block 840, the processing device implementing the method may cause the identified second software module to be deployed to the second target execution environment. The second target execution environment may be provided by a cloud-based infrastructure stack, as described in more detail herein above. Responsive to completing operations of block 840, the method may terminate.

Figure 9:
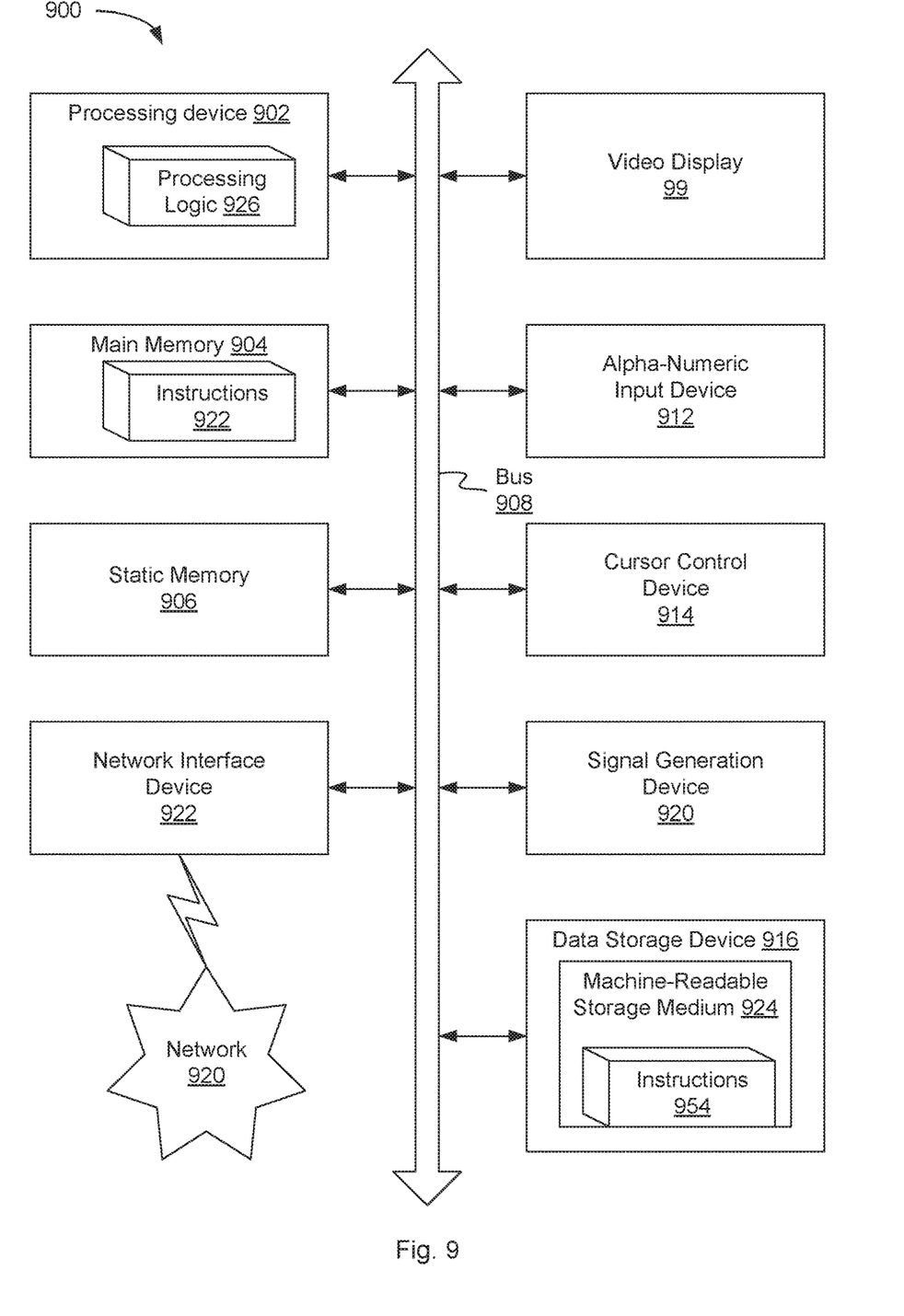
FIG. 9 illustrates a diagrammatic representation of a machine in the exemplary form of a computer system within which a set of instructions, for causing the machine to perform any one or more of the methods described herein, may be executed in one embodiment.

FIG. 9 illustrates a diagrammatic representation of a machine in the exemplary form of a computer system within which a set of instructions, for causing the machine to perform any one or more of the methods discussed herein, may be executed in one embodiment. A set of instructions for causing the computing device 900 to perform any one or more of the methods discussed herein may be executed by the computing device 900.

In one embodiment, the computing device 900 may be connected to other computing devices by a network provided by a Local Area Network (LAN), an intranet, an extranet, the Internet or any combination thereof. The computing device may operate in the capacity of a server or a client machine in a client-server network environment or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, a "computing device" referenced herein includes any collection of machines (e.g., computers) that individually or jointly execute a set (or multiple sets) of instructions to perform any one or more of the methodologies discussed herein.

In one embodiment, the computing device 900 includes a processing device 902, a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.) and a data storage device 919, which communicate with each other via a bus 908.

In one embodiment, the processing device 902 represents one or more general-purpose processors such as a microprocessor, central processing unit or the like. Processing device may include any combination of one or more integrated circuits or packages that may, in turn, include one or more processors (e.g., one or more processor cores). Therefore, a processing device may be provided by a single core CPU, a multi-core CPU, or a massively multi-core system that includes many interconnected integrated circuits, each of which may include multiple processor cores. The processing device 902 may therefore include multiple processors. The processing device 902 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor or the like.

In one embodiment, the computing device 900 may further include one or more network interface devices 922. The computing device 900 also may include a video display unit 99 (e.g., a liquid crystal display (LCD) or a cathode ray tube (CRT)), an alphanumeric input device 912 (e.g., a keyboard), a cursor control device 914 (e.g., a mouse) and a signal generation device 920 (e.g., a speaker).

In one embodiment, the data storage device 919 may include a computer-readable storage medium 924 on which is stored one or more sets of instructions 954 embodying any one or more of the methods or functions described herein. The instructions 954 may also reside, completely or at least partially, within the main memory 904 or within the processing device 902 during execution thereof by the computing device 900; the main memory 904 and the processing device 902 also constituting machine-readable storage media.

While the computer-readable storage medium 924 is shown as a single medium, a "computer-readable storage medium" as referenced herein includes a single medium or multiple media (e.g., a centralized or distributed database and associated caches and servers) that store the one or more sets of instructions. A "computer-readable storage medium" also includes any medium that is capable of storing, encoding or carrying a set of instructions for execution by the machine and that cause the machine to perform any one or more of the methods described herein. Examples of computer-readable storage media include, but not limited to, solid-state memories, optical media and magnetic media.

The preceding description sets forth numerous specific details such as examples of specific systems, components, methods and so forth, in order to provide a good understanding of various embodiments described herein. It will be apparent to one skilled in the art, however, that at least some embodiments may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

In the above description, numerous details are set forth. It will be apparent, however, to one of ordinary skill in the art having the benefit of this disclosure, that certain embodiments described herein may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. These signals may include bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, passages utilizing terms such as "determining", "identifying", "adding", "selecting" or the like, describe the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations described herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

It is to be understood that the above description is intended to be illustrative and not restrictive. Many other embodiments will be apparent to those of skill in the art upon reading and understanding the above description. The scope of the present disclosure should, therefore, be determined with reference to the appended claims, along with the full scope of equivalents to which such claims are entitled.

What is claimed is:

1. A method, comprising:
    identifying a profile of a target execution environment to implement a machine learning-based model in communication with a cloud infrastructure, wherein the profile of the target execution environment comprises a vector of values of parameters of the target execution environment;
    identifying, using the profile, a software module implementing the model, wherein the software module is compatible with the target execution environment; and
    causing the software module to be uploaded from a code repository associated with the cloud infrastructure to the target execution environment.

2. The method of claim 1, wherein the target execution environment is provided by one of: an IoT device or a cloud-based container.

3. The method of claim 1, wherein the model is provided by at least one of: a prediction model, a classification model, or a regression model.

4. The method of claim 1, wherein the profile of the target execution environment specifies one of: a memory available to the target execution environment, or a parameter of a processing unit of the target execution environment.

5. The method of claim 1, further comprising:
    causing a second software module to be uploaded to a second target execution environment residing in the cloud infrastructure, wherein the second software module is to be invoked by the software module.

6. The method of claim 1, wherein identifying the software module implementing the machine learning-based model further comprises:
    determining a target model size represented by a function of operational requirements and the profile of the target execution environment.

7. A computer system, comprising:
    a memory; and
    a processing device coupled to the memory, the processing device to:
        identify, using a profile of a first target execution environment, a first software module implementing a first prediction model;
        cause the first software module to be deployed to the first target execution environment;
        identify a second software module implementing a second prediction model to be invoked by the first prediction model, wherein a second prediction accuracy of the second prediction model exceeds a first prediction accuracy of the first prediction model; and cause the second software module to be deployed to a second target execution environment provided by a cloud-based infrastructure stack.

8. The computer system of claim 7, wherein the first target execution environment is provided by one of: an IoT device or a cloud-based container.

9. The computer system of claim 7, wherein the profile of the first target execution environment comprises a vector of values of parameters of the first target execution environment.

10. The computer system of claim 7, wherein to identify the first software module, the processing device is further to:
  determine a target model size represented by a function of operational requirements and the profile of the first target execution environment; and
  identify a software module associated with the target model size.

11. The computer system of claim 10, wherein the first prediction model is provided by at least one of: an image recognition mode, an image classification model, a face recognition model, or a speech recognition model.

12. The computer system of claim 7, wherein to identify the first software module, the processing device is further to:
  evaluate a fitness function reflecting respective degrees of compatibility of two or more candidate software modules with the profile of the first target execution environment.

13. A non-transitory computer-readable storage medium comprising executable instructions that, when executed by a processing device, cause the processing device to:
  identify, based on a target execution environment profile, a target execution environment to implement a machine learning-based model, wherein the target execution environment profile comprises a vector of values of parameters of the target execution environment;
  evaluate a fitness function reflecting degree of compatibility, with the target execution environment, of a plurality of candidate software modules implementing the model;
  identify a candidate software module associated with an optimal value of the fitness function; and
  cause the software module to be uploaded to the target execution environment.

14. The non-transitory computer-readable storage medium of claim 13, wherein the target execution environment is provided by one of: an IoT device or a cloud-based container.

15. The non-transitory computer-readable storage medium of claim 13, wherein the model is provided by at least one of: a prediction model, a classification model, or a regression model.

16. The non-transitory computer-readable storage medium of claim 13, wherein the fitness function is represented by a weighted sum of terms, each term representing a difference of a first value of a parameter of a model-specific optimal execution environment and a second value of the parameter of a candidate execution environment.

17. The non-transitory computer-readable storage medium of claim 13, wherein the model is provided by at least one of: an image recognition mode, an image classification model, a face recognition model, or a speech recognition model.

* * * * *